US012363480B1

(12) United States Patent
Su

(10) Patent No.: US 12,363,480 B1
(45) Date of Patent: Jul. 15, 2025

(54) HEADWEAR

(71) Applicant: Jiyan Su, Guangdong (CN)

(72) Inventor: Jiyan Su, Guangdong (CN)

( * ) Notice: Subject to any disclaimer, the term of this patent is extended or adjusted under 35 U.S.C. 154(b) by 0 days.

(21) Appl. No.: 19/024,512

(22) Filed: Jan. 16, 2025

(51) Int. Cl.
*A42B 1/00* (2021.01)
*A42B 1/008* (2021.01)
*H04R 5/033* (2006.01)

(52) U.S. Cl.
CPC ............. *H04R 5/033* (2013.01); *A42B 1/008* (2013.01)

(58) Field of Classification Search
CPC ................................ H04R 5/033; A42B 1/008
See application file for complete search history.

(56) References Cited

U.S. PATENT DOCUMENTS 6,088,836 A * 7/2000 de Cordova .............. A61F 9/04 2/206
8,031,560 B1 * 10/2011 Washington ........... G04G 13/02 368/244
9,071,903 B1 * 6/2015 Crockran, Jr. ........ H04R 1/1058
9,445,181 B1 * 9/2016 Atwater ............... H04R 1/1033
9,578,409 B1 * 2/2017 Crockran, Jr. .......... A42B 1/241
11,207,215 B2 * 12/2021 Bamberg .................. A61F 9/04
11,931,299 B2 * 3/2024 Bamberg .................. A61F 9/04
2008/0250547 A1 * 10/2008 Frank ..................... A42B 1/245 2/205
2009/0178177 A1 * 7/2009 Fairclough ........... A42B 1/0188 2/209
2009/0210995 A1 * 8/2009 Kwon ..................... A42B 1/245 2/209.13
2018/0177641 A1 * 6/2018 Fairclough ........... A42B 1/0188
2020/0107602 A1 * 4/2020 Domenighini ............ A41F 1/00

FOREIGN PATENT DOCUMENTS

CN 2916848 Y * 6/2007

* cited by examiner

*Primary Examiner* — Khaled Annis
(74) *Attorney, Agent, or Firm* — Daniel M. Cohn

(57) ABSTRACT

A headwear is provided, including a main body and loudspeakers. The main body is configured to worn on a human head, and a temperature variable substance is disposed in the main body. The loudspeakers are disposed in the main body, at least one of the loudspeakers is disposed at each of two opposite sides of the main body, each of the loudspeakers is configured to play audio toward a human ear. Functionality of the headwear is enhanced and diversified.

15 Claims, 6 Drawing Sheets

HEADWEAR

TECHNICAL FIELD

The present disclosure relates to a technical field of wearable devices, and in particular to a headwear.

BACKGROUND

With the progression of technology, there is a growing trend toward diversified functional requirements for wearable devices. Conventional headwears are mainly designed for warmth or as a fashion accessory, offering limited functionality that falls short of meeting multifaceted needs of users. Nowadays, the users are not only looking for basic comfort and style but also expect the headwears to integrate innovative features that enhance usability and offer a better user experience.

SUMMARY

Embodiments of the present disclosure provide a headwear, functionality of the headwear is enhanced and diversified.

The embodiments of the present disclosure provide the headwear, including a main body and loudspeakers. The main body is configured to worn on a human head, and a temperature variable substance is disposed in the main body. The loudspeakers are disposed in the main body, at least one of the loudspeakers is disposed at each of two opposite sides of the main body, each of the loudspeakers is configured to play audio toward a human ear.

Optionally, a cut-out section is disposed at one end of the main body, and the cut-out section is configured to expose a human nose.

Optionally, the main body is flexible, and the main body is foldable along a height direction thereof for stacking a first part thereof on a second part thereof.

Optionally, the main body includes an outer cover and the temperature variable substance, a chamber is defined in the outer cover, and the temperature variable substance is disposed in the chamber.

Optionally, the chamber is annular, the chamber surrounds the human head, and the temperature variable substance and the loudspeakers are disposed in the chamber.

Optionally, the temperature variable substance and each of the loudspeakers are stacked along a thickness direction of the main body.

Optionally, the temperature variable substance and each of the loudspeakers are staggered along the thickness direction of the main body.

Optionally, the main body includes an outer cover and the temperature variable substance, the outer cover defines a first chamber, a second chamber, and two third chambers, the first chamber, the second chamber, and the two third chambers are disposed at intervals. The first chamber is disposed opposite to the second chamber, the first chamber is configured to correspond a human face, the second chamber is configured to correspond a rear side of the human head, and the two third chambers are disposed opposite to each other and are disposed between the first chamber and the second chamber. The temperature variable substance is disposed in the first chamber and the second chamber, and the loudspeakers are respectively disposed in the two third chambers.

Optionally, the outer cover further defines fourth chambers, each of the fourth chambers is disposed between the first chamber and the second chamber, each of the fourth chambers and a corresponding one of the two third chambers are disposed along a height direction of the main body. The temperature variable substance is disposed in each of the fourth chambers.

Optionally, a corresponding one of the four chambers is disposed at each of two sides of each of the two third chambers along the height direction of the main body.

Optionally, the headwear further includes a controller, the controller is electrically connected to the loudspeakers, the controller is disposed in the main body.

Optionally, the controller includes at least one button, at least one mark portion is disposed on an outer surface of the main body, and the at least one button is disposed corresponding to the at least one mark portion.

Optionally, the headwear further includes a cable, the cable is connected to the controller, and the cable is partially exposed out of the main body for being electrically connected to an external device.

Optionally, the cable is connected to a power supply for supplying power to the controller and the loudspeakers.

Optionally, the cable is connected to an audio source device for providing audio signals to the controller and the loudspeakers.

Optionally, the main body includes a first side and a second side, the first side is opposite to the second side, and the loudspeakers are respectively disposed at the first side and the second side. The controller is disposed at the first side, at the second side, or between the first side and the second side.

Optionally, the main body includes an outer cover and a temperature variable substance, the temperature variable substance is disposed in the outer cover, and the outer cover is a stretchable fabric.

Optionally, the main body further includes a spacer, the spacer is disposed on an outer side of the outer cover and is connected to the outer cover, an accommodating space is defined between the spacer and the outer cover, and the controller is disposed in the accommodating space.

Optionally, the headwear is annular, the headwear defines two openings, the two openings are opposite to each other, and the two openings are configured to be worn on the human head.

Furthermore, the headwear is hat-shaped.

According to the present disclosure, the temperature variable substance is disposed in the main body of the headwear, and a temperature of temperature variable substance is capable of being flexibly regulated according to user requirements, so as to provide a comfortable temperature experience for users. At least one of the loudspeakers is disposed at each of two opposite sides of the main body, and each of the loudspeakers plays audio toward the human ear, so as to ensure that the audio is directly played to ears on two sides of the users for clear sound quality and better auditory experience. Therefore, the headwear of the present disclosure integrates functions of temperature regulation and audio playback, which not only intelligently regulates the temperature of the headwear based on user requirements, ensuring the comfortable temperature experience, but also plays audio toward the user ear, offering a stereo listening pleasure and meeting diversified requirements of the users.

BRIEF DESCRIPTION OF DRAWINGS

In order to more clearly illustrate technical solutions in embodiments of the present disclosure, accompanying drawings required in description of the embodiments are briefly described below, and obviously, the accompanying drawings in the following description are merely some embodiments of the present disclosure, and for those who skilled in the art, other drawings may be obtained according to structures shown in these drawings without creative efforts

DETAILED DESCRIPTION OF EMBODIMENTS

The following clearly and completely describes technical solutions in embodiments of the present disclosure with reference to accompanying drawings in the embodiments of the present disclosure, obviously, the described embodiments are only a part but not all of the embodiments of the present disclosure. All other embodiments obtained by those who skilled in the art based on the embodiments of the present disclosure without creative efforts shall fall within a protection scope of the present disclosure. In addition, it should be understood that specific implementations described herein are only used to illustrate and explain the present disclosure, and are not intended to limit the present disclosure. In the present disclosure, unless otherwise specified, directional terms, such as “up” and “down” generally refer to the up and down in an actual use or a working state of a device, specifically referring to an orientation in the accompanying drawings; while “inside” and “outside” are in relation to an outline of the device.

Figure 1:
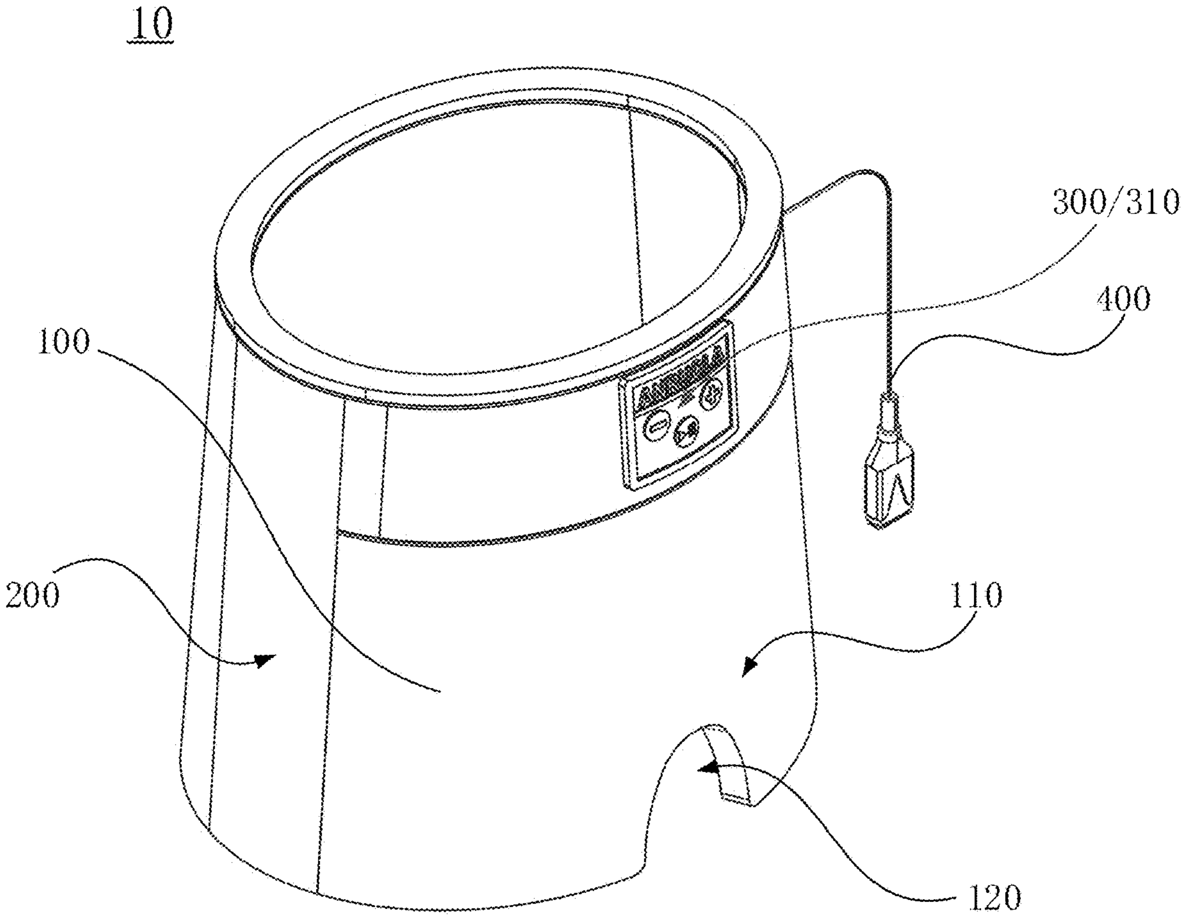
FIG. 1 is a structural schematic diagram of a headwear according to one embodiment of the present disclosure.
Figure 2:
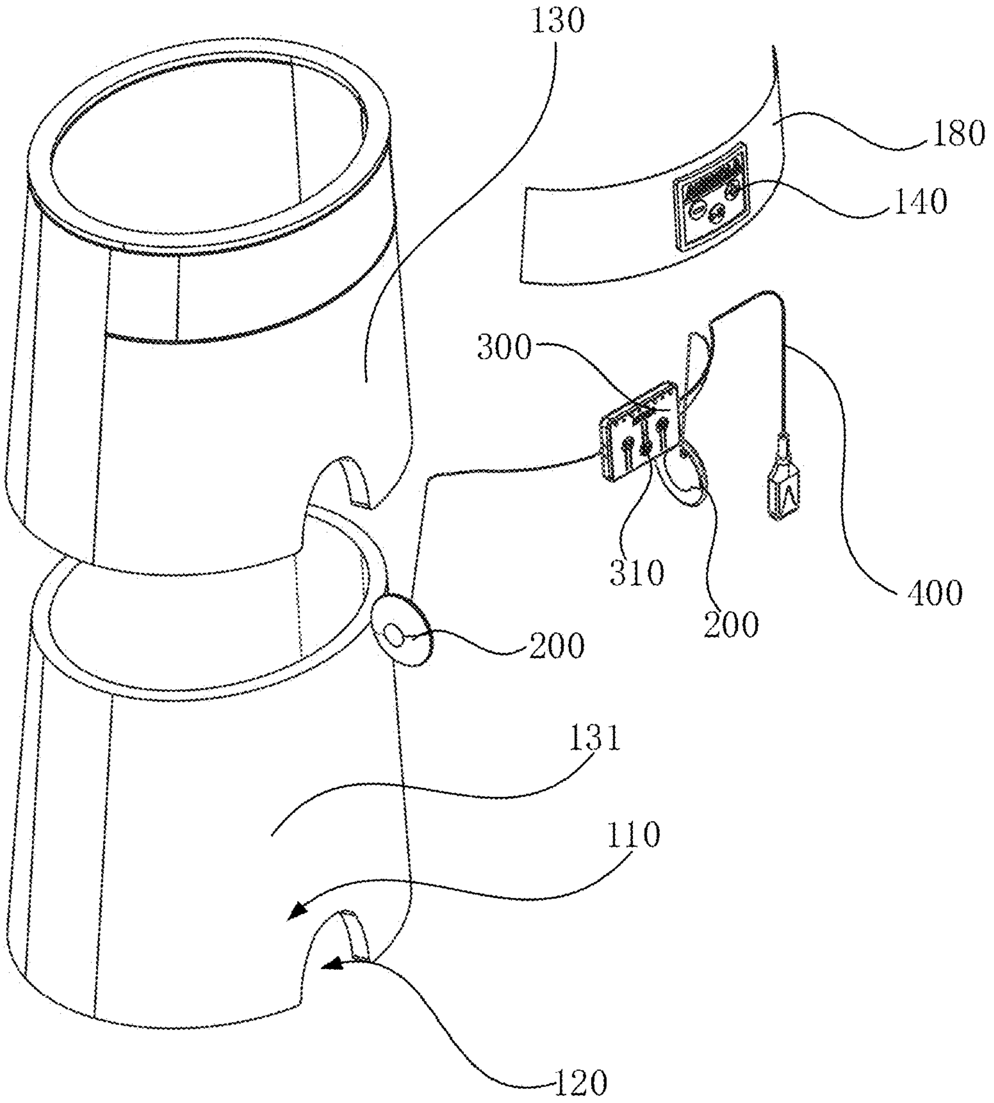
FIG. 2 is an exploded schematic diagram of the headwear shown in FIG. 1.
Figure 3:
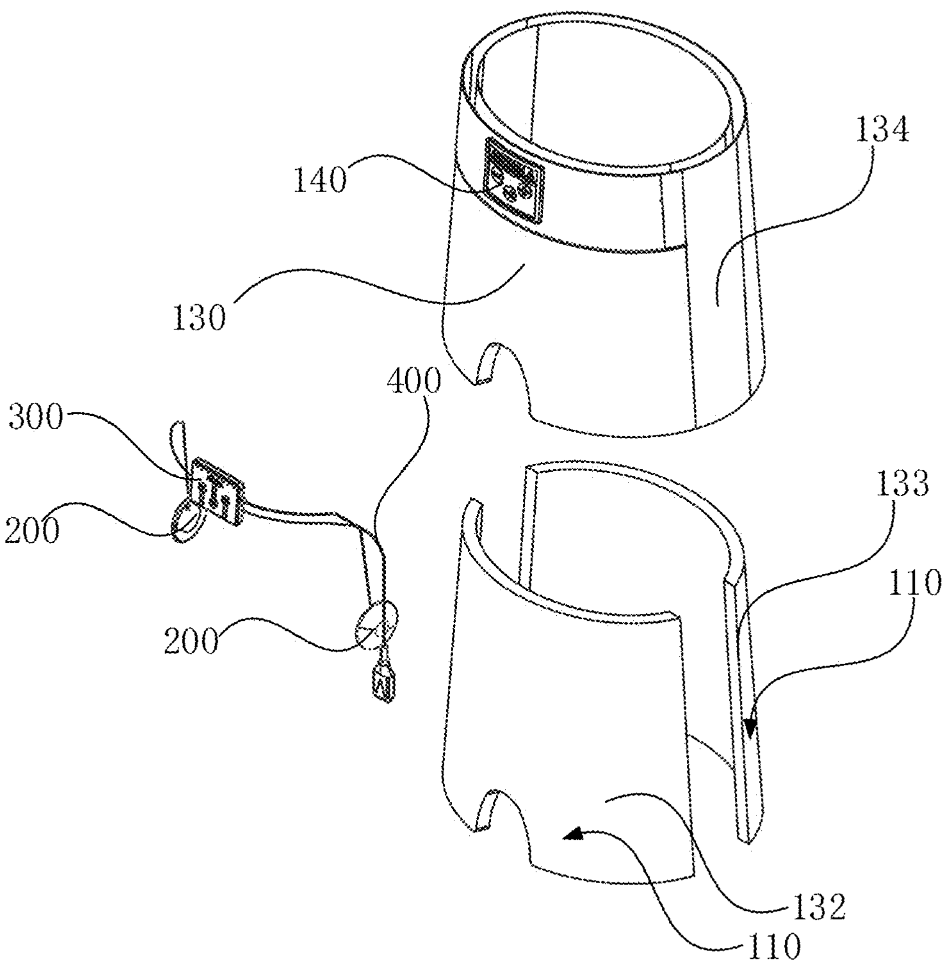
FIG. 3 is another exploded schematic diagram of the headwear shown in FIG. 1.
Figure 4:
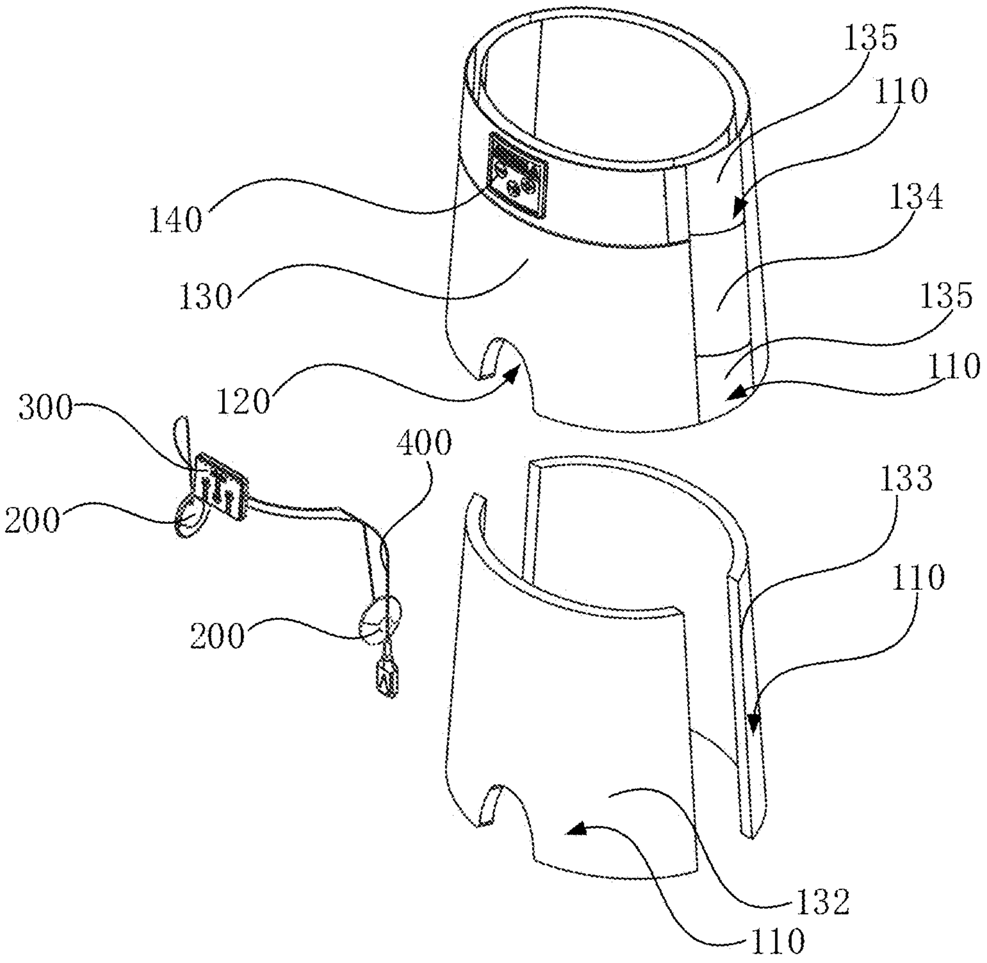
FIG. 4 is another exploded schematic diagram of the headwear shown in FIG. 1.

Please refer to FIGS. 1-4, FIG. 1 is a structural schematic diagram of a headwear according to one embodiment of the present disclosure, FIG. 2 is an exploded schematic diagram of the headwear shown in FIG. 1, FIG. 3 is another exploded schematic diagram of the headwear shown in FIG. 1, and FIG. 4 is another exploded schematic diagram of the headwear shown in FIG. 1. The embodiments of the present disclosure provide the headwear 10, including a main body 100 and loudspeakers 200. The main body 100 is configured to worn on a human head, and a temperature variable substance 110 is disposed in the main body 100. The loudspeakers 200 are disposed in the main body 100, at least one of the loudspeakers 200 is disposed at each of two opposite sides of the main body 100, each of the loudspeakers 200 is configured to play audio toward a human ear.

According to the present disclosure, the temperature variable substance 110 is disposed in the main body 100 of the headwear 10, and a temperature of temperature variable substance 110 is capable of being flexibly regulated according to user requirements, so as to provide a comfortable temperature experience for users. Exemplarily, the users may set a desired temperature range either through a controller 300 disposed in the headwear 10 or through connecting to an external device, such as a smartphone, then the temperature variable substance 110 heats or cools according to settings of the users to maintain a comfortable head temperature of the users. For example, in cold winter months, the users may increase the temperature of the temperature variable substance 110 to keep their heads warm; whereas in the hot summer, the temperature of the temperature variable substance 110 is lowered to ensure the heads of the users remains cool and comfortable. When a user has a fever, appropriate cooling effectively alleviates discomfort. Moreover, for a user suffering from a headache, setting a suitable heating temperature also provides effective relief. The temperature variable substance 110 is made of mediums, such gel, water, etc. which is not limited in the embodiments of the present disclosure.

At least one of the loudspeakers 200 is disposed at each of two opposite sides of the main body 100, and each of the loudspeakers 200 plays audio toward the human ear, so as to ensure that the audio is directly played to ears on two sides of the users for clear sound quality and better auditory experience. Exemplarily, the users also select audio content, such as music, audiobooks, etc., through the controller 300 disposed in the headwear 10 or through connecting to the external device, such as the smartphone. Audio signals are received by the loudspeakers 200 and played back, providing the users with an auditory enjoyment. Additionally, the users are also capable of adjusting volume levels, switching tracks, and perform other operations on the loudspeakers 200.

Exemplarily, the loudspeakers 200 disposed in the headwear 10 of the embodiments of the present disclosure are arranged in various configurations. For example, at least one speaker 200 is disposed at both left and right sides of the headwear 10, which directs audio straight toward the ears on the two sides of the users to deliver a clear sound quality experience and achieve a basic stereo effect. Building upon this basic configuration, additional speakers 200 are disposed at a front side and a rear side of the headwear 10, further enhancing a sense of audio envelopment. Moreover, based on the basic configuration, additional speakers 200 are further disposed at a top portion of the headwear 10 to provide the users with a more realistic overhead sound effect, which significantly enhances a three-dimensional sound experience. Furthermore, in some embodiments, the loudspeakers 200 are respectively disposed at the left side, the right side, the front side, the rear side, and the top portion of the headwear 10, in this way, sounds from all directions, whether the front, the rear, or the top, are accurately reproduced, delivering an exceptionally immersive auditory experience for the users.

The headwear of the present disclosure integrates functions of temperature regulation and audio playback, which not only intelligently regulates the temperature of the headwear according to the user requirements, ensuring the comfortable temperature experience, but also plays audio toward the user ear, offering a stereo listening pleasure and meeting diversified requirements of the users. For example, during outdoor activities, the users may regulate the temperature of the temperature variable substance 110 to maintain a comfortable head temperature of the users, whether warm or cool. During long trips, the users may also enjoy audio content, such as music, audiobooks, etc., through the loudspeakers 200, thereby enhancing relaxation.

In some embodiments, a cut-out section 120 is disposed at one end of the main body 100, and the cut-out section 120 is configured to expose a human nose.

Considering breathing comfort of the users while wearing the headwear 10, the cut-out section 120 is provided at the one end of the main body 100. When the users wear the headwear 10, the user nose is exposed outside through the cut-out section 120, allowing for free and unobstructed breathing without any feeling of stuffiness or discomfort.

Providing of the cut-out section 120 in the headwear 10 enhances breathability of the headwear 10, which significantly improves user comfort during wearing the headwear 10, ensuring that the users maintain clear breathing over extended periods, and preventing discomfort caused by restricted airflow. Meanwhile, a position and a size of the cut-out section 120 are meticulously designed to snugly fit around the user nose. Such design not only meets respiratory requirements but also preserves overall aesthetics and thermal insulation properties of the headwear 10.

In some embodiments, the main body 100 is flexible, and the main body 100 is foldable along a height direction thereof for stacking a first part thereof on a second part thereof.

The headwear 10 of the embodiments of the present disclosure not only considers functionality and comfort but also portability. The main body 100 is flexible, which is easily folded along the height direction thereof. When not in use, the users simply fold the main body 100, the first part of the main body 100 is layered over the second part of the main body 100, thereby significantly reducing a space occupied by the headwear 10. In this way, the headwear 10 is easy to store in a backpack or a suitcase without adding any extra burden, providing great convenience for carrying.

Moreover, since the main body 100 is flexible, the main body 100 has a certain degree of adaptability, which allows the headwear 10 to adjust according to a specific size and shape of the user head for a more customized fit, thereby ensuring a snug and comfortable wearing experience. Moreover, since the main body 100 is flexible, the main body 100 still ensures to retains the shape and performance even after multiple folding and unfolding cycles. Consequently, the users may enjoy a consistently high-quality wearing experience over extended periods of use.

In some embodiments, the main body 100 includes an outer cover 130 and the temperature variable substance 110, a chamber 131 is defined in the outer cover 130, and the temperature variable substance 110 is disposed in the chamber 131.

In the embodiments, the chamber 131 is defined in the outer cover 130 of the headwear 10, which provides a separate and enclosed space for the temperature variable substance 110 and further helps to maintain stability of the temperature variable substance 110, thereby preventing the temperature variable substance 110 from falling out or shifting during use of the headwear 10. The temperature of temperature variable substance 110 in the chamber 131 is capable of being adjusted according to external conditions or the user requirements, either by heating or cooling to provide a personalized temperature experience. Additionally, due to an independent space design of the chamber 131, the temperature variable substance 110 is confined within the chamber 131 and does not come into direct contact with a user head, thereby enhancing safety of using the headwear 10.

Please further refer to FIG. 2, in some embodiments, the chamber 131 is annular, the chamber 131 surrounds the human head, and the temperature variable substance 110 and the loudspeakers 200 are disposed in the chamber 131.

In the embodiments, the chamber 131 is annular, so as to encircle the user head and form a continuous and enclosed space to creates an integrated cavity, so that the temperature variable substance 110 in the chamber 131 surrounds the user head and is uniformly distributed around the user head, covering areas, such as a user face, a rear side of the user head, and sides of the user head. Such comprehensive distribution enables effective temperature regulation across an entire head portion of a user. It should be noted that the user face and the rear side of the user head may understood as a front surface and a rear surface of the user head.

Moreover, the loudspeakers 200 are also disposed in the chamber 131 being annular, and since the chamber 131 surrounds the user head, the loudspeakers 200 are more accurately positioned at any position of the user head according to the user requirements, such as near the user ear or other key positions of the users, thereby providing a three-dimensional and realistic sound experience. Moreover, direct contact between the loudspeakers 200 and the user head is also avoided due to a fact that the loudspeakers 200 are disposed in the chamber 131, discomfort brought from the loudspeakers 200 to the user head is reduced, and overall comfort and wearability of the headwear 10 is further enhanced.

In some embodiments, the temperature variable substance 110 and each of the loudspeakers 200 are stacked along a thickness direction of the main body 100.

In the embodiments, stacking arrangement of the temperature variable substance 110 and the loudspeakers 200 enhances space utilization of the headwear 10, enabling a more compact overall structure, thereby allowing the headwear 10 to accommodate more functional components.

Based on the stacking arrangement, the loudspeakers 200 are precisely positioned at any position of the main body 100 as required, such as near the user ear, to achieve an optimal sound experience. Meanwhile, the temperature variable substance 110 near the user ear is stacked above or below corresponding speakers 200. Such arrangement ensures effective temperature regulation around the user ear while meeting arrangement requirements for the loudspeakers 200, which ensures that functionalities of the temperature variable substance 110 and the corresponding speakers 200 are achieved at the same position of the user head. Exemplarily, when each of the loudspeakers 200 and the temperature variable substance 110 are stacked, isolation materials are disposed between each of the loudspeakers 200 and the temperature variable substance 110 for isolation, so as to ensure that each of the loudspeakers 200 and the temperature variable substance 110 independently operate without interference from each other.

In some embodiments, the temperature variable substance 110 and each of the loudspeakers 200 are staggered along the thickness direction of the main body 100.

In the embodiments, the temperature variable substance 110 and each of the loudspeakers 200 are staggered along the thickness direction of the main body 100, a certain spatial interval is formed between the temperature variable substance 110 and each of the loudspeakers 200, which helps to reduce physical interference between the temperature variable substance 110 and each of the loudspeakers 200. The temperature variable substance 110 expands or contracts during temperature regulation, while the loudspeakers 200 produce vibrations when in operation. Such spatial interval ensures that the temperature variable substance 110 and each of the loudspeakers 200 do not affect each other due to their changes, thereby ensuring independence and reliability between the temperature variable substance 110 and each of the loudspeakers 200. Additionally, such staggering arrangement allows sound of the loudspeakers 200 to be directly transmitted to the user ear without being shielded by the temperature variable substance 110, which reduces loss of sound in a transmission process, improves definition and three-dimensional sound experience of sound quality, and provide a better auditory experience for the users. In addition, the loudspeakers 200 may generate heat during operation, and the staggering arrangement also prevents the heat generated by the loudspeakers 200 from adversely affecting the temperature variable substance 110, which helps to better manage temperature environment inside the headwear 10.

Please refer to FIG. 3, in some embodiments, the main body includes the outer cover 130 and the temperature variable substance 100, the outer cover 130 defines a first chamber 132, a second chamber 133, and two third chambers 134, the first chamber 132, the second chamber 133, and the two third chambers 134 are disposed at intervals. The first chamber 132 is disposed opposite to the second chamber 133, the first chamber 132 is configured to correspond a human face, the second chamber 133 is configured to correspond a rear side of the human head, and the two third chambers 134 are disposed opposite to each other and are disposed between the first chamber 132 and the second chamber 133. The temperature variable substance 110 is disposed in the first chamber 132 and the second chamber 133, and the loudspeakers 200 are respectively disposed in the two third chambers 134.

In the embodiments, the outer cover 130 defines the first chamber 132, the second chamber 133, and the two third chambers 134 for respectively corresponding to different functions and human body parts. The first chamber 132 corresponds to the user face, the second chamber 133 corresponds to the rear side of the user head, and the two third chambers 134 are disposed between the first chamber 132 and the second chamber 133, that is, the two third chambers 134 correspond to side regions of the user head that are close to user ears.

The temperature variable substance 110 is disposed the first chamber 132 and the second chamber 133, thereby providing effective temperature regulation for the user face and the rear side of the user head. The loudspeakers 200 are respectively disposed in the two third chambers 134 that are disposed close to the user ears, such arrangement allows the loudspeakers 200 to be closer to the user ears, so as to offer a clearer and more stereo audio experience.

Since the temperature variable substance 110 and the loudspeakers 200 are disposed in different chambers, maintenance and replacement of the headwear 10 is more convenient. If any component requires maintenance or replacement, there is no need to disassemble other components, which greatly improves efficiency and convenience of maintenance. The temperature variable substance 110 in the first chamber 132 and the second chamber 133 is capable of being independently adjusted according to the user requirements, while the loudspeakers 200 in the two third chambers 134 is capable of independently operating without being affected by temperature changes of the temperature variable substance 110, which achieves an optimized layout for internal temperature regulation and audio playback in the headwear 10.

In some embodiments, the outer cover 130 further defines fourth chambers 135, each of the fourth chambers 135 is disposed between the first chamber 132 and the second chamber 133, each of the fourth chambers 135 and a corresponding one of the two third chambers 134 are disposed along a height direction of the main body 100. The temperature variable substance 110 is disposed in each of the fourth chambers 135.

In the embodiments, the outer cover 130 additionally defines the fourth chambers 135. The fourth chambers 135 are disposed between the first chamber 132 and the second chamber 133. The temperature variable substance 110 is disposed in the fourth chambers 135, so that the headwear 10 more comprehensively regulates a temperature of the user head, which is not just limited to the user face and the rear side of the user head but also extends to the sides of the user head. In this way, a more uniform temperature distribution is provided, and comfort of wearing the headwear 10 is enhanced. Moreover, each of the fourth chambers 135 and the corresponding one of the two third chambers 134 are disposed along the height direction of the main body 100, which not only avoids interference with corresponding loudspeakers 200 located in the corresponding one of the two third chambers 134, ensures normal operation of the corresponding loudspeakers 200 is unaffected by the temperature variable substance 110, but also allows the headwear 10 to offer effective temperature management in areas of the user head beside those covered by the third chambers 134, specifically the sides of the user head.

In some embodiments, a corresponding one of the four chambers 135 is disposed at each of two sides of each of the two third chambers 134 along the height direction of the main body 100.

In the embodiments, the corresponding one of the four chambers 135 is disposed at each of two sides, in a vertical direction, of each of the two third chambers 134, which effectively utilizes an internal space of the headwear 10, enabling the temperature variable substance 110 to cover more areas of the user head, such as positions, near a user neck, on the sides of the user head or positions close to a top portion of the user head, so as to provide an encompassing temperature regulation experience for the users. For example, in cold environments, the headwear 10 may better maintain warmth around the user head, while in hot environments, the headwear 10 offers enhanced cooling effects. Moreover, the fourth chambers 135 does not interfere with operation of the loudspeakers 200 respectively disposed in the two third chambers 134.

In this embodiment, the outer cover 130 of the headwear 10 includes one or more chambers for accommodating the temperature variable substance 110, which is capable of treating or alleviating symptoms, such as headaches, migraines, fever, and stress-related conditions. The headwear 10 covers an entire user head, including the user face. By providing the temperature variable substance 110 in chambers at different positions of the outer cover 130, targeted hot or cold compress treatments are administered around the user head, offering the users a more personalized treatment plan. Compared to conventional ice packs, the headwear 1 in the embodiments of the present disclosure more snugly fits against the user head and is enabled to stably wear on the user head, avoiding common issues of displacement or falling off associated with the conventional ice packs, which ensures continuity and effectiveness of the treatments. Moreover, the temperature variable substance 110 in the headwear 10 is capable of being heated or cooled as required, providing flexible temperature regulation options to meet various therapeutic requirements. Furthermore, the headwear 10 in the embodiments of the present disclosure further include the loudspeakers 200 that allow the users to listen to soothing music or other audio content during treatment, adding an extra layer of relaxation and enjoyment.

In some embodiments, the headwear 10 further includes the controller 300, the controller 300 is electrically connected to the loudspeakers 200, the controller 300 is disposed in the main body 100.

In some embodiments, the controller 300 includes at least one button 310, at least one mark portion 140 is disposed on an outer surface of the main body 100, and the at least one button 310 is disposed corresponding to the at least one mark portion 140.

In the embodiments, the controller 300 is disposed in the headwear 10 for managing audio playback functions of the loudspeakers 200, so as to ensure that the users may easily control the audio playback while wearing the headwear 10. For example, the users may control the loudspeakers 200 through simple button operations to perform functions, such as adjusting the volume, playing or pausing music, and switching between tracks. Moreover, the controller 300 is capable of connecting to devices, such as smartphones, though wired or wireless connections for further expanding functionalities, such as answering calls, using voice assistants, etc., which provides the users with a more intelligent and convenient audio playback experience.

In the embodiments, the at least one button 310 is disposed corresponding to the at least one mark portion 140, the at least one mark portion 140 is presented in a form of text, icons, or symbols, which is configured to clearly indicate a function of the at least one button 310, such as volume up/down, play/pause, and track forward/backward, so as to provide the users with an intuitive and easy-to-understand operation interface. The users only need to touch or simply glance at the at least one marking portion 140 to quickly identify and accurately operate a corresponding button 310, which effectively reduces a risk of incorrect operations and enhancing convenience and user-friendliness. The at least one mark portion 140 is disposed on the main body 100 through methods, such as printing, stitching, adhesive bonding, etc. Moreover, providing of the at least one marking portion 140 enhances an overall aesthetic appeal of the headwear 10.

In some embodiments, the headwear 10 further includes a cable 400, the cable 400 is connected to the controller 300, and the cable 400 is partially exposed out of the main body 100 for being electrically connected to an external device.

In the embodiments, the cable 400 allows the headwear 10 to be conveniently connected to an external electronic device. The users may connect the headwear 10 to the smartphones, music players, computers, or other audio output devices through the cable 400 to receive corresponding audio signals. The cable 400 is partially exposed out of the main body 100, which enables the users to easily connect the headwear 10 to and disconnect the headwear 10 from the external devices without needing to open the headwear 10 or perform complex operations.

In some embodiments, the cable 400 is connected to a power supply for supplying power to the controller 300 and the loudspeakers 200.

In the embodiments, connecting the cable 400 to the power supply enables the controller 300 and the loudspeakers 200 in the headwear 10 to receive a continuous and stable supply of power, which ensures normal operations of the audio playback and all control functions, eliminating concerns about battery depletion.

In some embodiments, the cable 400 is connected to an audio source device for providing audio signals to the controller 300 and the loudspeakers 200.

In the embodiment, the cable 400 is connected to various audio source devices, so as to provide the audio signals to the controller 300 and the loudspeakers 200. Such wired connection not only ensures stable audio output but also effectively avoids issues, such as signal interference and signal loss that may occur with wireless transmission. By using the cable 400, the headwear 10 is easily connected to different audio source devices, including the smartphones, tablets, MP3 players, and the computers, which significantly enhances versatility and flexibility of the headwear 10. The users only need to connect the headwear 10 to any audio source device through the cable 400 to enjoy an audio experience.

A connecting terminal is connected to an end of the cable 400, the connecting terminal is capable of connecting to adapters, power banks, audio source devices, etc. A type of the connecting terminal is selected according to the user requirements, such as a universal serial bus (USB) terminal, a Micro USB terminal, or a Type-C terminal. A specific type of the connecting terminal is not limited in the embodiments of the present disclosure.

It should be noted that, in the embodiments of the present disclosure, the headwear 10 is wirelessly connected to the external devices, the audio source devices, the power sources, etc., which is not limited in the embodiments of the present disclosure.

Figure 5:
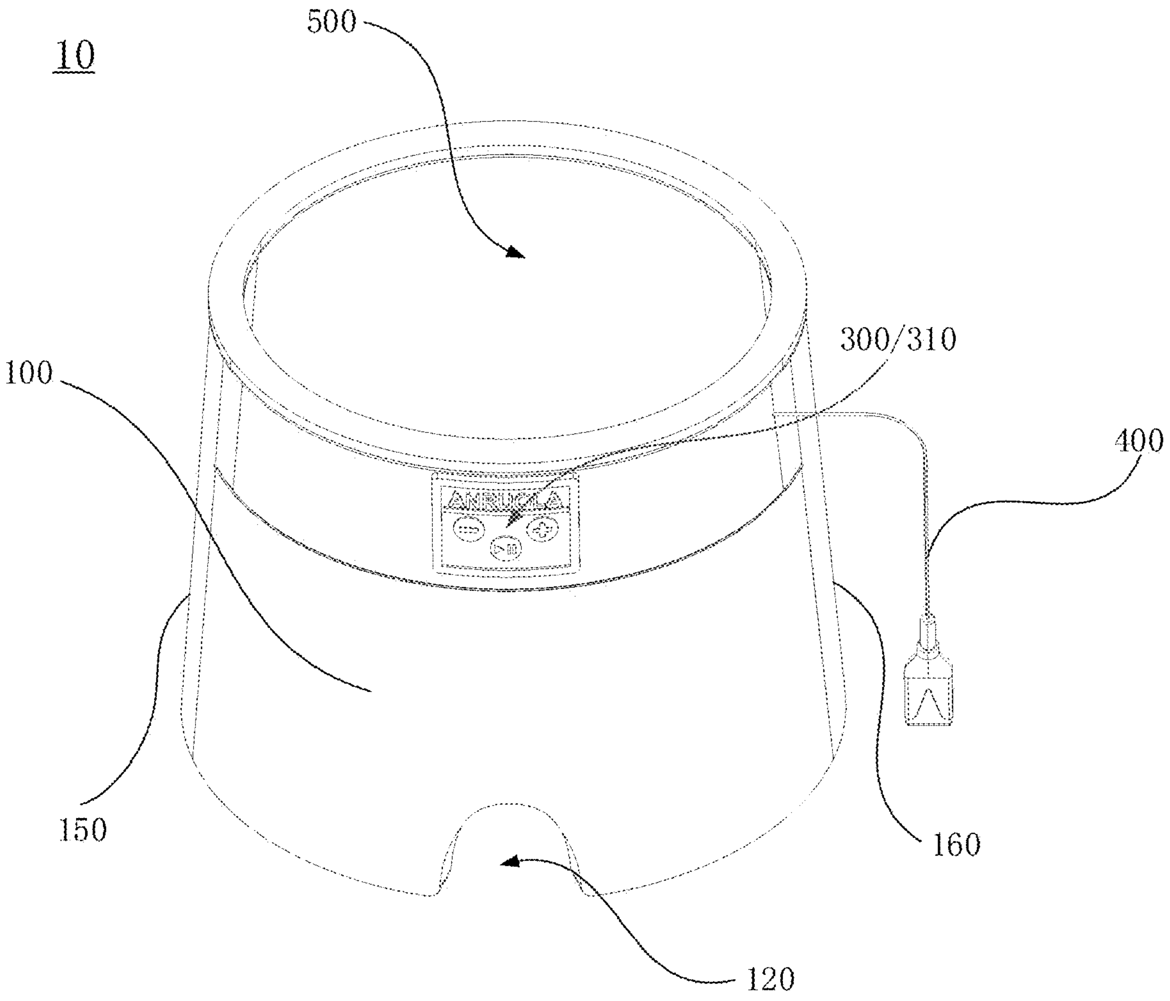
FIG. 5 is another structural schematic diagram of the headwear shown in FIG. 1.
Figure 6:
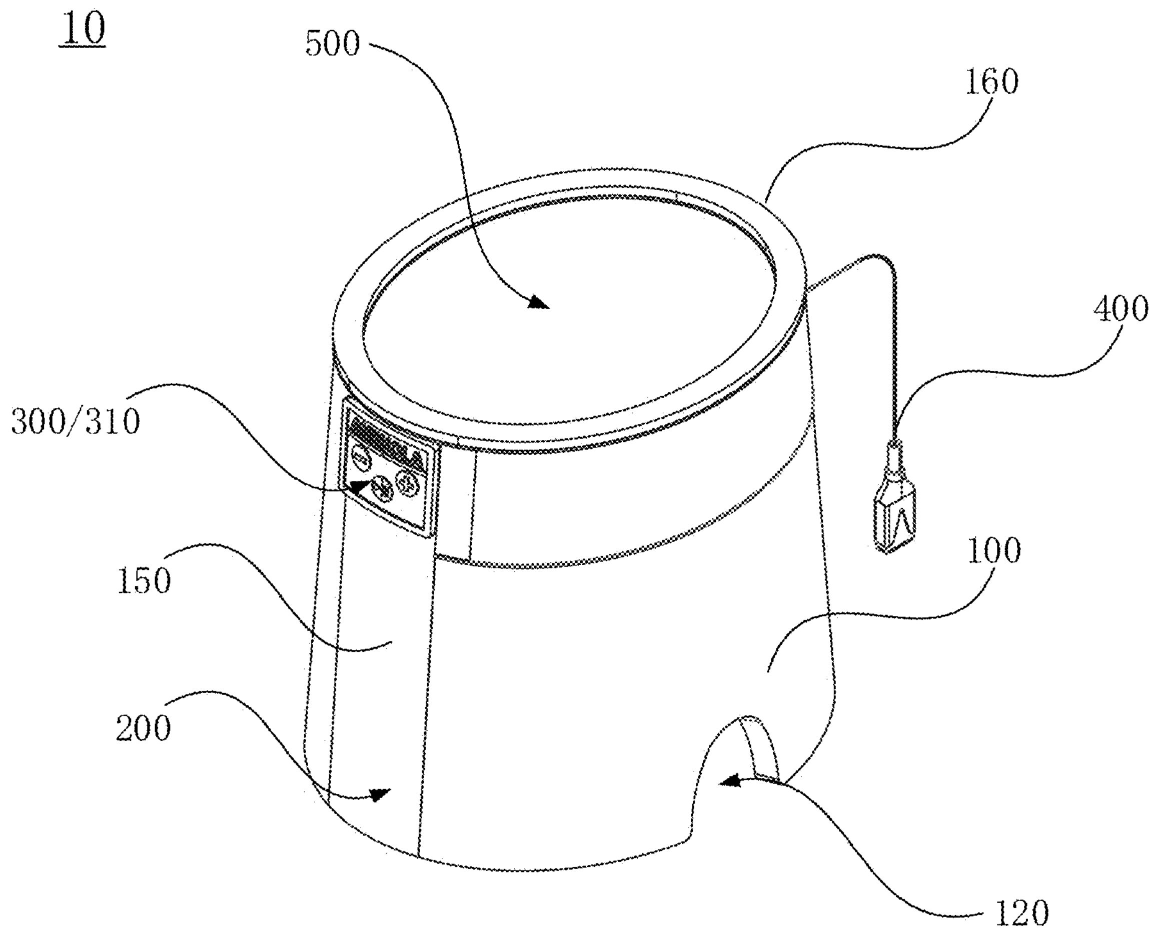
FIG. 6 is a structural schematic diagram of the headwear according to another embodiment of the present disclosure.

Please refer to FIGS. 5-6, FIG. 5 is another structural schematic diagram of the headwear shown in FIG. 1, and FIG. 6 is a structural schematic diagram of the headwear according to another embodiment of the present disclosure. In some embodiments, the main body 100 includes a first side 150 and a second side 160, the first side 150 is opposite to the second side 160, and the loudspeakers 200 are respectively disposed at the first side 150 and the second side 160. The controller 300 is disposed at the first side 150, at the second side 160, or between the first side 150 and the second side 160.

In this embodiment, the controller 300 is optionally disposed at the first side 150, at the second side 160, or between the first side 150 and the second side 160. On one hand, from a perspective of cable arrangement, the controller 300 is disposed closer to the loudspeakers 200, thereby simplifying routing of cable 400 and enhancing overall aesthetic tidiness. On the other hand, the controller 300 integrates a variety of practical functions, including, but not limited to, volume control, track switching, call answering, etc., since the controller 300 is disposed relatively close to the loudspeakers 200, the users may easily perform operations, such as volume adjustment or song switching, by simply pressing the at least one button 310 on the controller 300, which enhances operational convenience.

In some embodiments, the main body 100 includes an outer cover 130 and a temperature variable substance 110, the temperature variable substance 110 is disposed in the outer cover 1130, and the outer cover 130 is a stretchable fabric.

In the embodiments, the outer cover 130 is made of a material of stretchable fabric. Such material has good elasticity and softness, so as to allow the headwear 10 to comfortably fit different sizes of the user head. Since the stretchable fabric has ability to withstand repeated stretching without losing shape, the outer cover 130 made of the material of the stretchable fabric not only provides enhanced flexibility for the headwear 10 to easily put on or take off, but also increases durability of the headwear 10. Moreover, the stretchable fabric has excellent breathability, which helps to maintain a dry and comfortable environment around the user head and is especially advantageous during temperature regulation of the temperature variable material 110, in this way, issues, such as overheating or sweating is avoided. The stretchable fabric is typically lightweight, so that the headwear 10 is more portable and comfortable without adding extra burden to the users, which is suitable for a long-term use. Further, the outer cover 130 made of the material of the stretchable fabric is easy to clean and maintain, so as to bring convenience for the users to clean the headwear 10.

It should be noted that, to achieve flexibility of the main body 100, in some embodiments, other materials are also selected to meet specific requirements. For example, plastic materials, rubber-based materials, or composite materials are selected. A specific material of the outer cover 130 is not limited in the embodiments of the present disclosure.

Please further refer to FIG. 2, in some embodiments, the main body 100 further includes a spacer 180, the spacer 180 is a fabric layer and is disposed on an outer side of the outer cover 130 and is connected to the outer cover 130, an accommodating space is defined between the spacer 180 and the outer cover 130, and the controller 300 is disposed in the accommodating space.

In the embodiments, the controller 300 is disposed in the accommodating space between the spacer 180 and the outer cover 130, the spacer provides a stable mounting position for the controller 300, thereby reducing a risk of displacement or damage of the controller 300 due to intense movement or accidental impacts. The spacer 180 further serves as a protective layer for the controller 300, which shields the controller 300 from dust and other potential hazards, thereby extending a service life of the controller 300. Moreover, providing of the spacer 180 prevents direct contact between a user skin and the controller 300, the spacer is typically made of soft materials, so as to enhance user comfort when interacting with the controller 300 and minimize discomfort that could arise from direct contact with a hard surface of the controller 300. Furthermore, the accommodating space between the spacer 180 and the outer cover 130 facilitates management of the cable 400 connected to the controller 300, thereby contributing to overall tidiness and aesthetic appeal of the main body 100.

In some embodiments, the headwear 10 is annular, the headwear 10 defines two openings 500, the two openings 500 are opposite to each other, and the two openings 500 are configured to be worn on the human head. In some other embodiments, the headwear 10 is hat-shaped. A specific shape of the headwear 10 is customized to suit user preferences in various forms, whether an annular shape or a hat shape. Each shape has its own unique advantages. For example, the headwear 10 being annular is more suitable for scenarios requiring quick putting-on and taking-off as well as excellent breathability, and the headwear 10 being circular offers comprehensive coverage and enhanced stability, which is suitable for outdoor activities and cold weather conditions. Therefore, based on requirements and usage habits of different users, the headwear 10 is capable of being designed in various forms to meet diversified requirements of the users.

The headwear 10 in the embodiments of the present disclosure is described in detail above, and specific examples are used herein to describe principles and the embodiments of the present disclosure, and description of the above embodiments is only used to help understand a method of the present disclosure and a core idea thereof, meanwhile, for those who skilled in the art, according to the idea of the present disclosure, there may be changes in specific embodiments and application ranges. In summary, a content of the present specification should not be construed as limiting the present disclosure.

What is claimed is:

1. A headwear, comprising:

a main body; and loudspeakers;

wherein the main body is configured to be worn on a human head, and a temperature variable substance is disposed in the main body;

wherein the loudspeakers are disposed in the main body, at least one of the loudspeakers is disposed at each of two opposite sides of the main body, each of the loudspeakers is configured to play audio toward a human ear;

wherein the main body comprises an outer cover and the temperature variable substance, a chamber is defined in the outer cover, and the temperature variable substance is disposed in the chamber;

wherein the chamber is annular, the chamber surrounds the human head, and the temperature variable substance and the loudspeakers are disposed in the chamber;

wherein the temperature variable substance and each of the loudspeakers are stacked along a thickness direction of the main body.

2. The headwear according to claim 1, wherein a cut-out section is disposed at one end of the main body, and the cut-out section is configured to expose a human nose.

3. The headwear according to claim 1, wherein the main body is flexible, and the main body is foldable along a height direction thereof for stacking a first part thereof on a second part thereof.

4. The headwear according to claim 1, wherein the headwear further comprises a controller, the controller is electrically connected to the loudspeakers, the controller is disposed in the main body.

5. The headwear according to claim 4, wherein the controller comprises at least one button, at least one mark portion is disposed on an outer surface of the main body, and the at least one button is disposed corresponding to the at least one mark portion.

6. The headwear according to claim 4, wherein the headwear further comprises a cable, the cable is connected to the controller, and the cable is partially exposed out of the main body for being electrically connected to an external device.

7. The headwear according to claim 6, wherein the cable is connected to a power supply for supplying power to the controller and the loudspeakers.

8. The headwear according to claim 6, wherein the cable is connected to an audio source device for providing audio signals to the controller and the loudspeakers.

9. The headwear according to claim 4, wherein the main body comprises a first side and a second side, the first side is opposite to the second side, and the loudspeakers are respectively disposed at the first side and the second side; and the controller is disposed at the first side, at the second side, or between the first side and the second side.

10. The headwear according to claim 4, wherein the outer cover is a stretchable fabric.

11. The headwear according to claim 10, wherein the main body further comprises a spacer, the spacer is disposed on an outer side of the outer cover and is connected to the outer cover, an accommodating space is defined between the spacer and the outer cover, and the controller is disposed in the accommodating space.

12. The headwear according to claim 1, wherein the headwear is annular, the headwear defines two openings, the two openings are opposite to each other, and the two openings are configured to be worn on the human head.

13. The headwear according to claim 1, wherein the headwear is hat-shaped.

14. A headwear, comprising:

a main body; and loudspeakers;

wherein the main body is configured to be worn on a human head, and a temperature variable substance is disposed in the main body;

wherein the loudspeakers are disposed in the main body, at least one of the loudspeakers is disposed at each of two opposite sides of the main body, each of the loudspeakers is configured to play audio toward a human ear;

wherein the main body comprises an outer cover and the temperature variable substance, a chamber is defined in the outer cover, and the temperature variable substance is disposed in the chamber;

wherein the chamber is annular, the chamber surrounds the human head, and the temperature variable substance and the loudspeakers are disposed in the chamber;

wherein the temperature variable substance and each of the loudspeakers are staggered along a thickness direction of the main body.

15. A headwear, comprising:

a main body; and loudspeakers;

wherein the main body is configured to be worn on a human head, and a temperature variable substance is disposed in the main body;

wherein the loudspeakers are disposed in the main body, at least one of the loudspeakers is disposed at each of two opposite sides of the main body, each of the loudspeakers is configured to play audio toward a human ear;

wherein the headwear further comprises a controller, the controller is electrically connected to the loudspeakers, the controller is disposed in the main body;

wherein the main body comprises a first side and a second side, the first side is opposite to the second side, and the loudspeakers are respectively disposed at the first side and the second side; and the controller is disposed at the first side, at the second side, or between the first side and the second side.

* * * * *